(12) United States Patent
Fishteyn et al.

(10) Patent No.: US 9,276,370 B2
(45) Date of Patent: Mar. 1, 2016

(54) HIGH-POWER LIQUID-COOLED PUMP AND SIGNAL COMBINER

(71) Applicant: OFS Fitel, LLC, Norcross, GA (US)

(72) Inventors: Michael Fishteyn, Bridgewater, NJ (US); Marc Mermelstein, Highland Park, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/011,859

(22) Filed: Aug. 28, 2013

(65) Prior Publication Data

US 2015/0062693 A1   Mar. 5, 2015

(51) Int. Cl.
| | |
|---|---|
| *H01S 3/04* | (2006.01) |
| *G02B 6/032* | (2006.01) |
| *H01S 3/094* | (2006.01) |
| *H01S 3/067* | (2006.01) |

(52) U.S. Cl.
CPC .............. *H01S 3/0407* (2013.01); *G02B 6/032* (2013.01); *G02B 2006/0325* (2013.01); *H01S 3/0401* (2013.01); *H01S 3/0404* (2013.01); *H01S 3/06754* (2013.01); *H01S 3/094003* (2013.01)

(58) Field of Classification Search
CPC ........................................................ G02B 6/032
See application file for complete search history.

(56) References Cited

U.S. PATENT DOCUMENTS

| | | | | |
|---|---|---|---|---|
| 3,920,980 | A * | 11/1975 | Nath ............................... | 362/582 |
| 4,603,940 | A * | 8/1986 | Shaw .................... | G02B 6/2821 |
| | | | | 372/6 |
| 5,333,227 | A * | 7/1994 | Ishiharada et al. ............ | 385/100 |
| 5,373,576 | A * | 12/1994 | Minns et al. ................... | 385/125 |
| 5,386,427 | A * | 1/1995 | Zayhowski ...................... | 372/34 |
| 5,546,493 | A * | 8/1996 | Noguchi et al. ................ | 385/125 |
| 5,673,341 | A * | 9/1997 | Takesue ................. | G01N 21/03 |
| | | | | 250/227.11 |
| 5,748,663 | A * | 5/1998 | Chenausky ...................... | 372/64 |
| 5,857,052 | A * | 1/1999 | Nath .............................. | 385/125 |
| 6,888,859 | B2 * | 5/2005 | Weber et al. .................... | 372/34 |
| 7,164,818 | B2 * | 1/2007 | Bryan et al. .................... | 385/33 |
| 7,349,596 | B2 | 3/2008 | Anderegg | |

(Continued)

FOREIGN PATENT DOCUMENTS

| | | |
|---|---|---|
| CN | 102255227 | 11/2011 |
| WO | 2012/088267 | 6/2012 |

OTHER PUBLICATIONS

Computer cooling. (Aug. 27, 2012). In Wikipedia, The Free Encyclopedia. Retrieved 22:58, Aug. 30, 2014, from http://en.wikipedia.org/w/index.php?title=Computer_cooling&oldid=509510150.*

(Continued)

*Primary Examiner* — Ari M Diacou
(74) *Attorney, Agent, or Firm* — Mandelbaum Salsburg

(57) ABSTRACT

Embodiments of the present invention are generally related to a high-power liquid-cooled pump and signal combiner and methods thereof for fiber optic applications. More specifically, embodiments of the present invention relate to a pump and signal combiner capable of conveying several kilowatts of pump laser power for kilowatt class rare-earth doped fiber amplifiers without suffering thermal damage. In one embodiment of the present invention, a high-power, heat dissipating optical fiber device comprises a section of optical fiber configured to propagate light, a cooling chamber, substantially encapsulating the optical fiber, and a fluid within the cooling chamber having a refractive index selected to control the interaction and propagation of the light in the fluid.

17 Claims, 5 Drawing Sheets

(56) References Cited

U.S. PATENT DOCUMENTS

| | | | |
|---|---|---|---|
| 7,983,312 B2* | 7/2011 | Shkunov et al. | 372/6 |
| 8,983,256 B2* | 3/2015 | Konishi | G02B 6/3624 |
| | | | 385/100 |
| 2002/0105997 A1* | 8/2002 | Zhang | H01S 3/109 |
| | | | 372/70 |
| 2003/0044149 A1* | 3/2003 | Fraval et al. | 385/125 |
| 2003/0063884 A1* | 4/2003 | Smith et al. | 385/129 |
| 2009/0041061 A1* | 2/2009 | Shkunov et al. | 372/6 |
| 2009/0097808 A1* | 4/2009 | Wolfe | G02B 6/032 |
| | | | 385/125 |
| 2012/0056081 A1* | 3/2012 | Kozodoy | 250/227.25 |
| 2014/0050448 A1* | 2/2014 | Konishi | G02B 6/3624 |
| | | | 385/100 |

OTHER PUBLICATIONS

Frank Kreith, Ronald E. West. CRC Handbook of Energy Efficiency. CRC Press, 1996. pp. 82-99.*

"Extended European Search Report", for EP14182121.5, Mailed Dec. 23, 2014, 7 pages.

"Understanding Optical Properties for Epoxy Applications", found at www.epotek.com, 2 pages.

"EPO-Tek UV Curve Selector Guide", found at www.epotek.com, 3 pages.

* cited by examiner

HIGH-POWER LIQUID-COOLED PUMP AND SIGNAL COMBINER

STATEMENT REGARDING FEDERALLY SPONSORED RESEARCH AND DEVELOPMENT

This invention was made with government support in part under a contract No. HR0011-08-C-0125 granted by the Defense Advanced Research Projects Agency (DARPA). The government has certain rights in the invention. The views expressed are those of the inventors and do not reflect the official policy or position of the Department of Defense or the U.S. Government.

BACKGROUND

1. Field of the Invention

Embodiments of the present invention are generally related to a high-power liquid-cooled pump and signal combiner and methods thereof for fiber optic applications. More specifically, embodiments of the present invention relate to a pump and signal combiner capable of conveying several kilowatts of pump laser power for kilowatt class rare-earth doped fiber amplifiers without suffering thermal damage.

2. Description of the Related Art

Generally, the optical power output of rare-earth doped fiber amplifiers is limited to within a one kilowatt regime. Efforts to bring such amplifier output into the high-power range (i.e., greater than one kilowatt) have been made, but have not yielded successful results for long-term operation due to number of component failures from thermal damage.

Achieving high-power output requires the use of laser-pump combiners capable of combining multi-kilowatt power levels of pump laser power, and delivering the pump radiation to waveguides such as low-index coated passive or gain fibers to convey the pump light. However, in known attempts, the absorption of significant levels of pump power by unwanted contaminants on the fiber surface, contaminants at splice points and/or absorption by the coating material, results in very large local temperature increases and often cause catastrophic damage of the pump and signal combiner.

Competing amplifier and pump combiner requirements make optimization of the overall amplifier performance difficult. In most fiber applications, it is desirable for the rare-earth doped amplifier to have a small outside diameter to maximize the overlap of the pump radiation with the rare-earth doped core of the fiber, and minimize the amplifier fiber length. However, a smaller outside fiber diameter of the pump combiner output requires a larger numerical aperture, by virtue of the brightness theorem, which increases the likelihood of stray radiation and unwanted local heating.

One significant reason current pump-signal combiner package designs fail when attempting to achieve high-power output stems from the fact that the tapered and pigtail fibers are being surrounded by substantially stagnant air. The presence of the air is inefficient, and generally insufficient, for the cooling of local heat spots. In addition, air is a very low-index surround medium, supporting high numerical aperture light which is often absorbed by the coating medium at the transition between air-surrounded and coating-surrounded glass, and further increasing the likelihood of failure due to thermal damage.

Thus, there is a need for a high-power pump and signal combiner with more efficient and effective thermal dissipation. This need can be met by liquid-cooled combiners.

SUMMARY

Embodiments of the present invention are generally related to a high-power liquid-cooled pump and signal combiner and methods thereof for fiber optic applications. More specifically, embodiments of the present invention relate to an optical fiber components and structures, such as pump and signal combiners, splices, endcaps and modefield adapters, capable of conveying several kilowatts or more of pump and signal laser power in kilowatt class rare-earth doped fiber amplifiers without suffering thermal damage.

In one embodiment of the present invention, a high-power, cooled optical fiber device comprises a section of optical fiber configured to propagate light; a cooling chamber, substantially encapsulating the optical fiber; and a fluid within the cooling chamber having a refractive index selected to alter the properties of the light.

In another embodiment of the present invention, a cooling system for an optical fiber component or structures, such as pump and signal combiner, comprises a component or structure capable of propagating an output greater than one kilowatt, comprising a coated optical fiber, at least a section of bare fiber; a cooling chamber, substantially encapsulating the component or structure; and a liquid within the cooling chamber, wherein the liquid is substantially transparent to pump radiation and comprises a refractive index substantially similar to or less than a refractive index of the bare fiber. Or the index of the liquid is similar to or less than the index of the coating.

In yet another embodiment of the present invention, a method of cooling a pump and signal combiner comprises providing a pump and signal combiner, the combiner comprising at least a bare fiber; encapsulating the pump and signal combiner in a cooling chamber having a fluid therein, wherein the fluid is substantially transparent to pump radiation and comprises a refractive index substantially similar to or less than a refractive index of the bare fiber; introducing a measurable amount of pump light into the pump and signal combiner; and producing an output greater than one kilowatt from the pump and signal combiner.

In other embodiments, the coated fiber is encapsulated in a cooling chamber having a fluid therein which has refractive index similar to or greater than the index of the coating.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
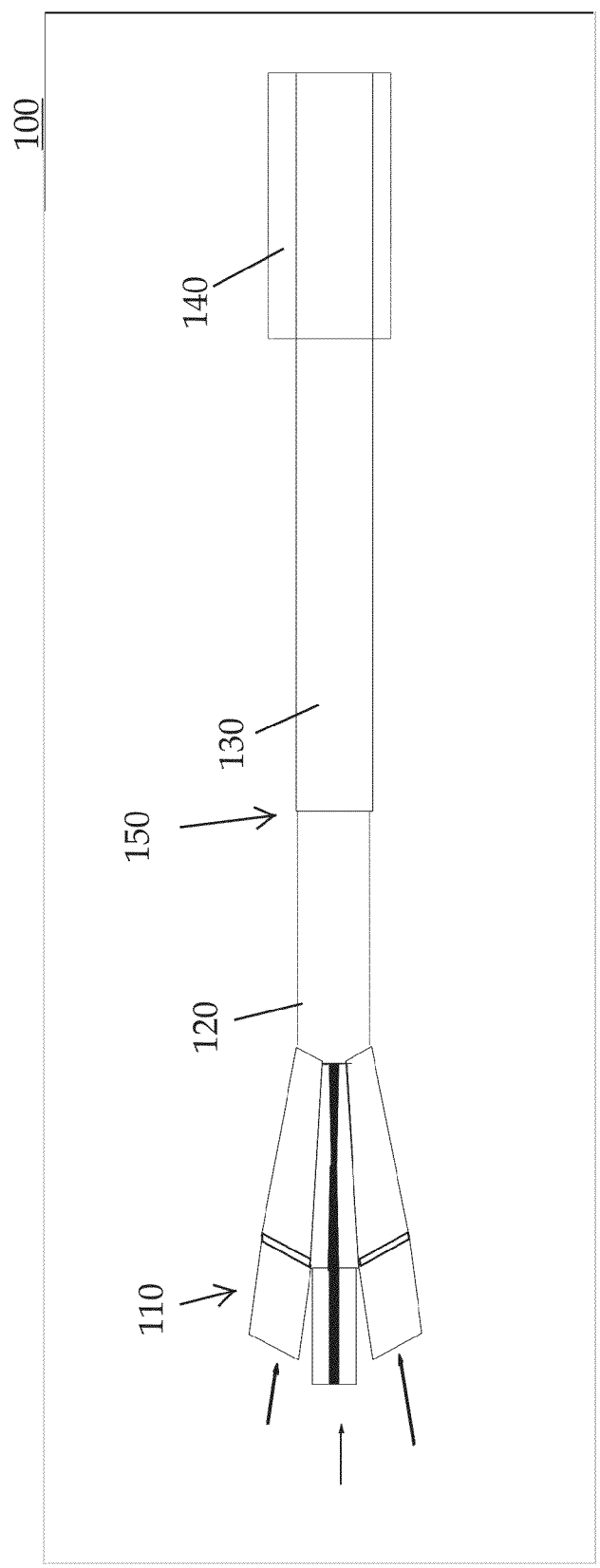
FIG. 1 depicts a schematic of a basic pump and signal combiner in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are generally related to a high-power liquid-cooled pump and signal combiner and methods thereof for fiber optic applications. More specifically, embodiments of the present invention relate to a pump and signal combiner capable of conveying several kilowatts of pump laser power for kilowatt class rare-earth doped fiber amplifiers without suffering thermal damage.

Embodiments of the present invention are disclosed herein as being suitable for use with a laser pump and signal combiner for fiber optic assemblies. However, further embodiments of the present invention appreciate the applicability of the methods and structures disclosed herein for numerous additional fiber and related applications, and should be understood to be inclusive thereof. For example, any type of laser diode or amplifier assembly, including those for military-, industrial-, medical-, telecommunication-use or the like, may be operable with embodiments of the present invention.

FIG. 1 depicts a schematic of a basic pump and signal combiner in accordance with one embodiment of the present invention. As shown in the Figure, a basic pump and signal combiner 100 generally comprises an input 110 for coupling to at least a plurality of input pumps and signals, a waist region 120, a splice region 150, a resulting uncoated or bare fiber segment 130 and a coated fiber segment 140. In accordance with embodiments of the present invention, any number of fibers, signals, etc. being coupled in the combiner 100 may be suitable for embodiments for the present invention. As used herein, "bare fiber" generally means a glass fiber devoid of polymer coating or buffering material conventionally designed to provide mechanical protection of the glass surface, where the goal of removing the coating is often to reduce thermal impedance between the glass and the package and to eliminate absorbing materials.

In many embodiments of the present invention, the plurality of input signals originate from pump laser diodes, a seed laser, the output of high power lasers or amplifiers, combinations thereof, or the like. Similarly, the coated fiber 140 may be any type of coated fiber suitable for embodiments of the present invention, such as a gain fiber or a passive fiber.

Figure 2:
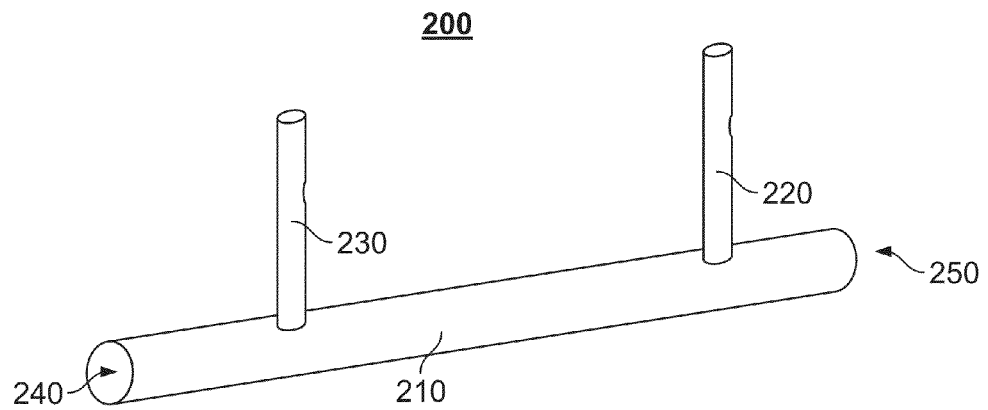
FIG. 2 depicts a cooling chamber in accordance with another embodiment of the present invention.

FIG. 2 depicts a cooling chamber for use with a pump and signal combiner in accordance with alternative embodiments of the present invention. The cooling chamber 200 generally comprises at least a hollow chamber 210 having a combiner input 240 and a combiner output 250. In operation, a pump and signal combiner would be assembled within the hollow chamber 210, such that the plurality of input sources feed into the input 240 and the coated fiber exits the output 250. For purposes of embodiments of the present invention, rather than a cooling chamber as shown in the Figure, a cooling chamber may comprise any type of vessel or chamber that serves to contain and guide the fluid so that it is contact with the bare and coated optical fiber segments.

Figure 3:
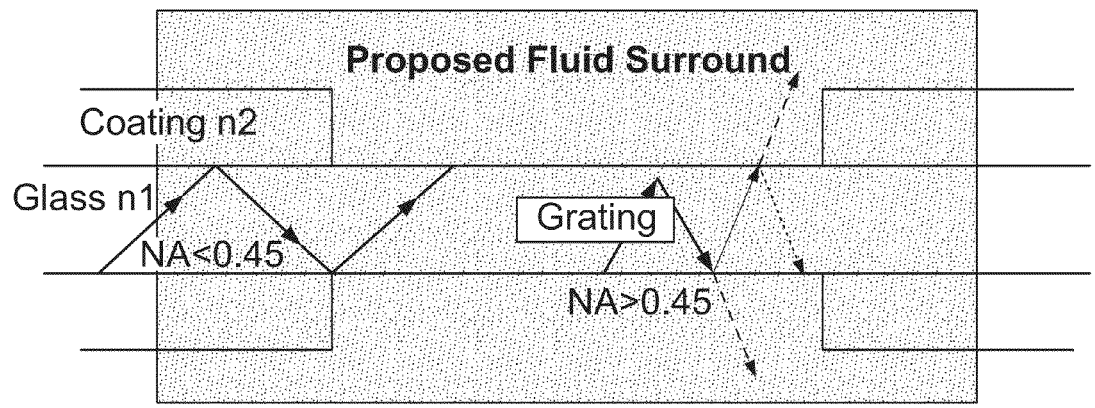
FIG. 3 depicts a schematic showing a bare fiber with a perturbing segment such as a grating, within a fluid surround in accordance with another embodiment of the present invention.

In some embodiments, the bare fiber segment 130 and perhaps 5-20 mm of the coated fiber segment 140 directly adjacent to either or both ends of the bare fiber segment 130, and in one instance about 10 mm of the coated fiber segment 140, should be placed between the fluid ingress 220 and the fluid egress 230. For example, FIG. 3 depicts a schematic showing a bare fiber segment within a fluid surround in accordance with another embodiment of the present invention, showing the fluid surrounding a portion of the coating on each end of the bare fiber segment.

Returning to FIG. 2, the hollow chamber 210 may generally comprise a glass, metal or polymer-based capillary, having minimal impact on the optical properties of the fiber and components within the cooling chamber 200. Optionally, the hollow chamber 210 may comprise walls having cooling elements therein to further enhance the processes described herein. Once the pump and signal combiner is assembled within the hollow chamber 210, the open areas around the input 240 and output 250 may optionally be sealed with a sealant, gel, epoxy, resin or the like, which may be refractive index-matching, as described in detail with regard to the fluid below. In such an optional embodiment, the sealant may have zero or nominal effects of the optical properties of the pump and signal combiner when utilized therewith.

Optionally, the cooling chamber 200 further comprises a fluid ingress 220 and a fluid egress 230. As shown in the embodiment in the Figure, the fluid ingress 220 and egress 230 may be provided in the form of projected chambers extending from the hollow chamber 210. In alternative embodiments, the fluid ingress 220 and egress 230 may take any form suitable for embodiments of the invention, and may be positioned along any portion of the outer surface of the hollow chamber 210. Ingress 220 and egress 230 may remain part of chamber 200, or may be present only for device assembly and then removed once assembly is complete. In such an embodiment, the entry ports in chamber 210 may be sealed to provide containment of the liquid.

Generally, the cooling chamber 200 further comprises a fluid therein. The fluid may generally act as a surround medium for the bare fiber exposed within the cooling chamber 200, in operation. As used herein, unlike a cured polymer, a "fluid" exerts minimal shear stress, such as net stress lateral to the axis of the device due to pressure or temperature changes as systems utilizing embodiments of the present invention are likely to undergo. In most embodiments, the presence of fluid within the cooling chamber 200 provides enhanced heat extraction capability due to the thermal conductivity properties of the fluid. For example, superior natural convection cooling and forced convection cooling, as described herein, may be achieved with a fluid, thereby reducing the fiber and package temperature and the possibility of catastrophic breakdown. As such, in many embodiments, the fluid comprises a heat transfer coefficient of at least 100 $W/m^2/deg$.

In addition to the cooling properties of the fluid, for many embodiments of the present invention, suitable fluids comprise a refractive index that allows modification of the optical properties of the device, such as control of the numerical aperture of the bare fiber components of the pump-signal combiner, or control of the numerical aperture of the coating. Such modification can allow removal of excessively high numerical aperture light from the bare optical fiber, thereby preventing light from being absorbed and converted to heat by the low-index fiber coating once it enters the coated section of the fiber. In this case, the refractive index of the fluid should be less than that of the bare fiber so that the bare fiber remains an effective waveguide. Furthermore, the index should be similar to or less than that of the coating to create a numerical aperture not too different from that of the coated optical fiber. In other instances, the refractive index of the fluid should be similar to or greater than that of the coating to effectively strip light out of the coating. Light propagation in the coating is often undesirable as it leads to heating due to the poor optical transparency of typical coatings. Such light can be coupled into the coating at structures such as splices, gratings, tapers, or any perturbation to the waveguide whether intended or unintended that will cause guided light in the core or cladding to propagate in the coating material.

For many suitable fluids, a desired refractive index of the fluid may be achieved by temperature control of the fluid; however, the selection of a proper fluid may still be required initially, before desired adjustments to its properties can be achieved through thermal control. In some embodiments, the suitable fluid may also comprise high transparency so that the light stripped by the fluid does not generate local heating, as is the case with opaque materials that are used for heat transport and high numerical aperture stripping (e.g. thermal compounds like THERM-A-FORM T644, commercially manufactured by Chomerics, a division of Parker Hannifin Corp. of Woburn, Mass.).

In many embodiments of the present invention, the fluid comprises a liquid. In one embodiment, the liquid comprises a refractive index-matching liquid, specifically designed to comprise specific refractive index properties, for example, those commercially manufactured and sold by Cargille-Sacher Laboratories Inc. of Cedar Grove, N.J. In another embodiment, the fluid comprises an oil-based fluid, such as Krytox®, manufactured and sold by E.I. du Pont de Nemours and Company of Wilmington, Del. In yet another embodiment, the fluid comprises a naturally-occurring fluid, such as water. In further embodiments of the present, the fluid may comprise any liquid having controllable and/or identifiable thermal and optical properties, namely, opacity/transparency, refractive index, and the like.

It is appreciated that varying embodiments of the present invention may require fluids having varying refractive indices. Each pump and signal combiner assembly may utilize components, such as the bare fiber, having a particular refractive index of its surface that should be matched by the fluid. As such, embodiments of the present invention should not be deemed limited beyond the association of optical properties between the pump and signal combiner and the fluid. However, in certain instances, such as utilizing embodiments of the present invention to cool a coated or recoated region of a fiber, the refractive index of the fluid may be greater than the coating with nominal interference, in any, with the optical properties.

Figure 4A:
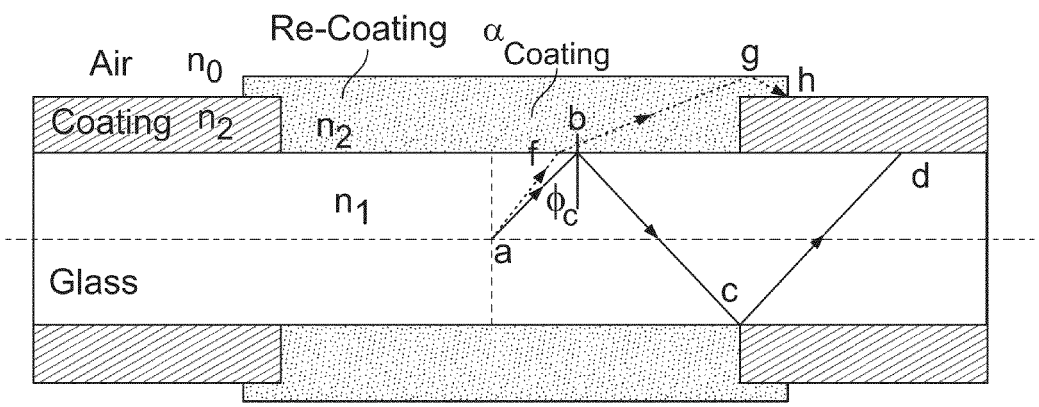
FIG. 4A depicts a schematic showing a fiber perturbation in the plane represented by the dashed vertical line in accordance with an embodiment of the present invention.

In addition to refractive index, a fluid may be selected for its transparency to pump radiation during operation of the pump and signal combiner. By being substantially transparent to the pump radiation, the fluid avoids becoming a heat source itself, contributing to the undesirable thermal load. The advantage of using a fluid surround medium in the vicinity of a fiber optic perturbation (such as a splice, grating, taper, etc . . . ) is illustrated in FIG. 4A. FIG. 4A shows a fiber perturbation in the plane represented by the dashed vertical line. Shown in the diagram is the optical fiber with an optical index $n_1$ (in this example no distinction is made of the optical index of the fiber core and cladding since we are concerned primarily with the pump light propagating in the fiber cladding). The fiber has a coating with an optical index $n_2 < n_1$ and the splice region is recoated with a recoating material having an optical index $n_2$ essentially equal to that to that of the coating material.

A bound ray propagating in the optical fiber core/cladding is shown by the ray abcd. The light energy essentially remains within the glass fiber numerical aperture and makes an angle $\phi > \phi_c$ with the glass coating interface that is greater than the critical angle $\phi_c$. The perturbation generates a light ray that exceeds the fiber numerical aperture and makes an angle $\phi < \phi_c$ and therefore propagates in the recoated segment of the fiber, as shown by the ray afgh. The recoating material is highly absorbing exhibiting an absorption coefficient of 500 m$^{-1}$ at 1.0 μm. Hence the optical power propagating in the coating is converted to heat at a rate of $P(s)=P_0 \exp(-\alpha_{coating} s)$ where s is the ray path length in the recoating material and $P_0$ is the initial optical power in the ray.

Figure 4B:
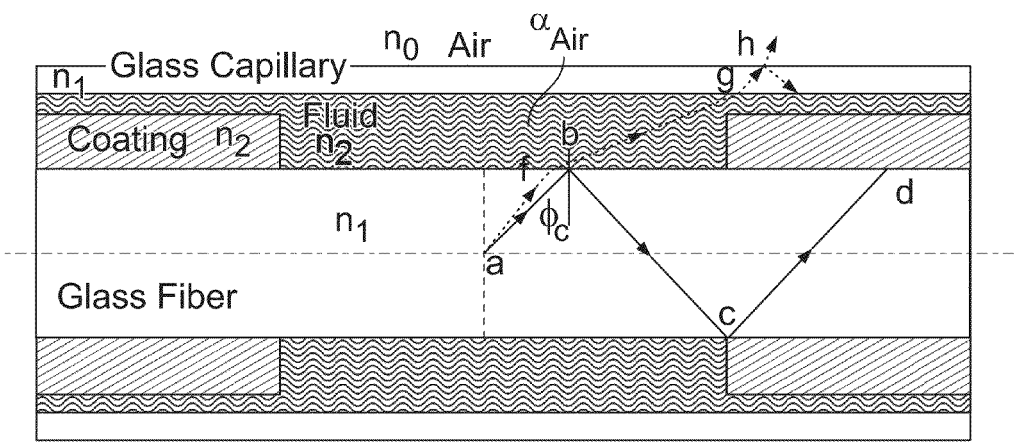
FIG. 4B depicts a schematic showing a fiber in the fluid surround utilizing for fiber cooling processes as described by various embodiments of the present invention.

FIG. 4B illustrates the fluid surround utilizing for fiber cooling presented in this disclosure. The recoating material of FIG. 4A is now replaced by the fluid as shown in FIG. 4B. The fluid is contained in the fiber region by a glass capillary tube. In this case, optical rays generated by the perturbation that exceed the fiber NA and make an angle with the glass-fluid interface that is less than the critical angle $\phi_c$, will now propagate in the transparent fluid, as indicated by the ray afgh. For example, water has an optical absorption coefficient $\alpha_{H_2O}=10$ m$^{-1}$. Hence the heat generated in the fluid medium by the optical power in ray afgh is given by: $P(s)=P_0 \exp(-\alpha_{H_2O} s)$. Moreover, light striking the capillary glass tube is refracted into the glass tube and directed away from the fluid and coating, thereby further reducing the heat load.

The heat reduction n the fluid surround configuration relative to that of the recoated surround configuration is simply given by:

$$10 \cdot \log\left(\frac{\alpha_{H_2O}}{\alpha_{coating}}\right) = -17 \text{ dB}$$

Hence, the transparent fluid surround medium maintains guidance of the pump radiation in the fiber core/cladding while reducing the strength of the heat source by 17 dB relative to that of a polymer coated fiber.

In many embodiments, the fluid has a transparency of less than about 1% optical absorption over 1 mm of path length. In certain embodiments, however, as an upper bound, dissipating more than 50 W per cm of fiber is very challenging.

Depending on the nature of the embodiment, the fluid may be provided as either stagnant, i.e., passively present within the hollow chamber 210, or may be dynamic, i.e., moving through the hollow chamber 210 via the fluid ingress 220 and fluid egress 230. In many embodiments, where the fluid is intended to have a forced convective cooling effect on the pump and signal combiner, the fluid ingress 220 and fluid egress 230 may be coupled to a fluid pump (not shown), e.g., a micro-pump, optionally having a cooling system, e.g., a refrigeration system, or temperature controlling system to control the fluid temperature for refractive index control, even in a passive case, coupled thereto. In such an embodiment, the pump may control a flow rate of a fluid in the fluid ingress 220, through the hollow chamber 210 and out the fluid egress 230. In some embodiments, the position of chambers 220 and 230 can be swapped. Other similarly known types of closed fluid systems may be utilized in accordance with embodiments of the present invention.

In one experimental embodiment, three pump and signal combiners were exposed to immersion in exemplary fluids; the three fluids utilized were water, Krytox and a Cargille index-matching fluid. After six months, despite general predictions by those of ordinary skill in the art in the industry, none of the pump and signal combiner components showed any significant swelling and only minor, or insignificant, delamination was exhibited. In addition, it was exhibited that the fluid environment (e.g. emersion in water) did not induce any crack growth in the glass fiber, likely due to the stress-free environment of the fiber in the pump and signal combiner.

FIG. 4 depicts a thermal image of an experimental embodiment of a pump and signal combiner having a tapered fiber bundle (TFB) operating within a cooling chamber in accordance with yet another embodiment of the present invention. As shown in the Figure, during operation, hot spots arose within the pump and signal combiner, particularly at the coating. The experimental embodiment utilized water to cool the hot spots.

In the Figure, the top thermal image depicts a pump and signal combiner in a cooling chamber with stationary water, operating at a pump optical power of 200 W. Without a cooling chamber, the most problematic areas of the assembly (i.e., around the coating) would be expected to reach temperatures of approximately greater than 100 degrees, based upon an approximation that an absorption length of approximately one mm requires only 100 mW of optical power to generate a 100 degree Celsius temperature rise. The fluid coolant is designed to greatly reduce the temperature of the heated light absorbing coating. It is expected that the liquid filled chamber will provide a temperature reduction of a local hot spot relative to the air filled chamber that scales with the ratio of the thermal conductivities [W/m-deg-C.] of the water to that of the air, i.e., 0.6:0.025 or approximately 13.8 dB. It is not possible to directly measure the surface temperature of the heated coating with the IR camera because it is enclosed in the water filled coolant chamber. However, the heating of the fiber segment is inferred from the rise in the surface temperature of the coolant chamber generated by the internal heated fiber segment. Due to the distribution of heat over a larger region than an air filled capillary and due to heat conduction and natural convection of the water, the hot spot was measured at 29 degrees Celsius at the surface of the cooling chamber with 200 W of optical power in the TFB.

In the Figure, the lower image shows the same device with forced flow of water within the cooling chamber. The forced water flow provides a further significant reduction in the heating of the cooling chamber surface, and in this example, reduced it by approximately 4.4 degrees Celsius. Although not measurable, such results indicate a likely reduction in temperature at the coating surface as well.

Various alternative embodiments of the present invention allow for the systems and methods disclosed herein to be utilized for other benefit. For example, in one embodiment, the methodology disclosed herein may be utilized with any bare fiber segment that conveys very high pump or signal power (>kW) where the fiber segment exhibits a perturbation or discontinuity in the refractive index or diameter, and thereby scatters a significant amount of light (greater than a damage threshold) at an angle greater than the appropriate NA of the fiber corresponding to the glass-coating interface. In such an embodiment, this perturbation may be due to the placement of a Bragg grating in the fiber core or due to the splicing of two dissimilar fibers.

Figure 5:
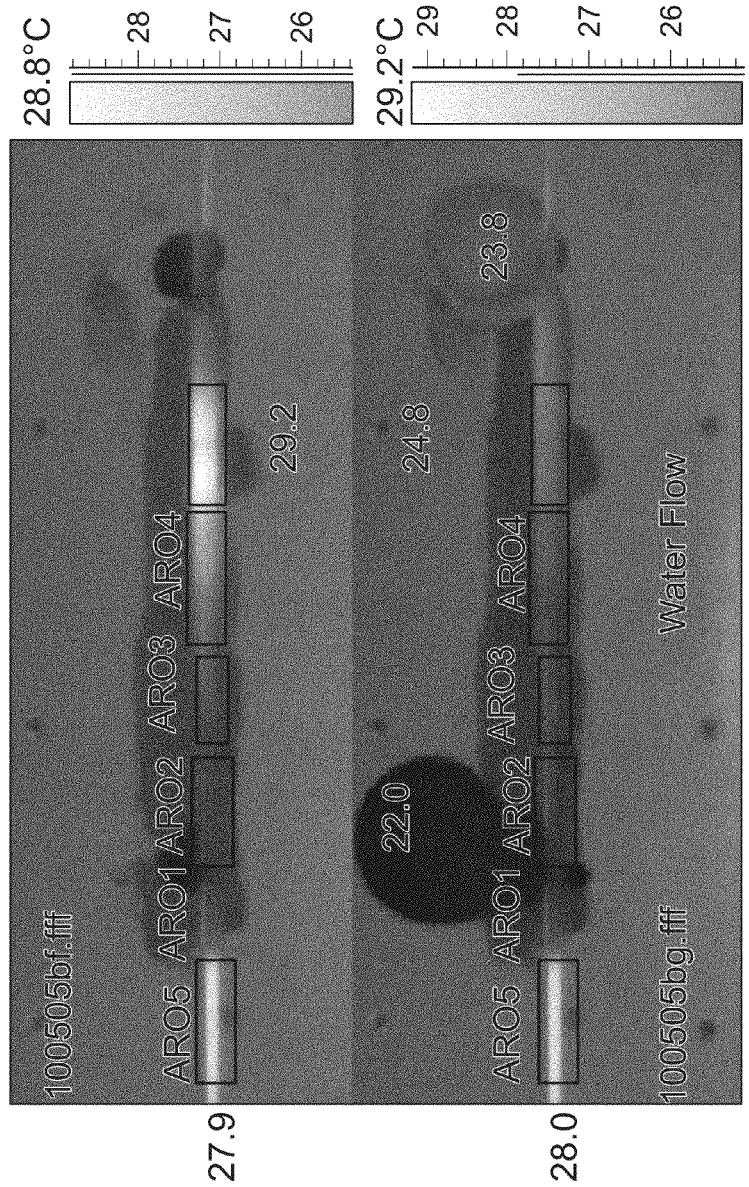
FIG. 5 depicts a thermal image of an experimental embodiment of a pump and signal combiner operating within a cooling chamber in accordance with yet another embodiment of the present invention.
Figure 6:
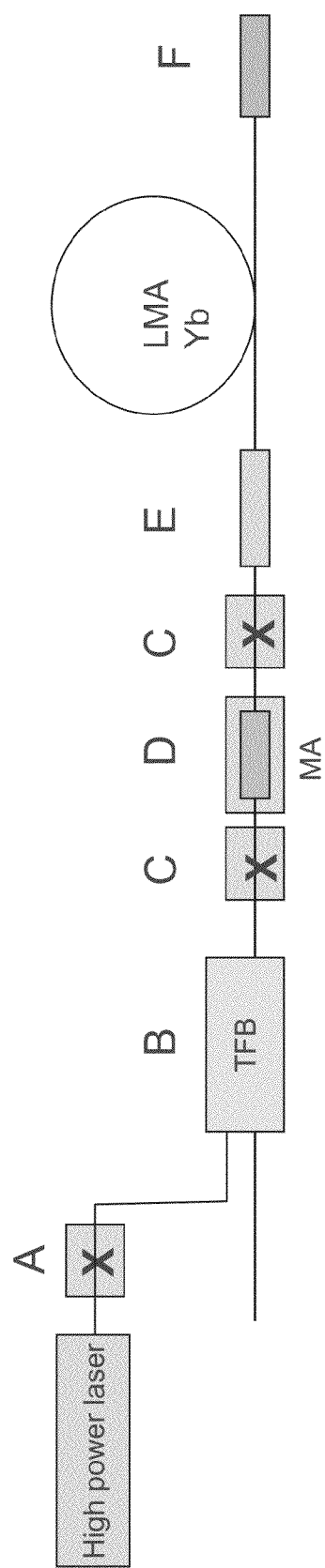
FIG. 6 depicts a basic schematic of a power amplifier system where "hot spots" may be suitable for embodiments of the present invention.

For example, in some alternative embodiments of the present invention, the methodology disclosed herein may be utilized to cool coated fiber segments that appear at various locations in a high power fiber amplifier, such as the one depicted in FIG. 5. In such an embodiment, various "hot spots" may occur where a fiber transitions between coated and uncoated regions for a variety of reasons, depending on the particular application.

In the schematic shown in the Figure, the "hot spots" may be identified by section. Section A comprises a splice between the laser diode module pigtail to a TFB pump leg, with low or high index recoat; Section B comprises a TFB, having a waist region, splice region, bare fiber region and coated fiber region, similar to the embodiment shown in FIG. 1; Section C comprises a splice, with low index recoat, between dissimilar optical fibers; Section D comprises a mode adapter with low index recoat; Section E comprises a low index coated Ytterbium doped fiber with a heat producing quantum defect region; and Section F comprises the coating-bare fiber interface at the output end-cap. Back-reflections can couple light back into the fiber through the end-cap, increasing the thermal load on the coating. As each of these plausible "hot spots" may suffer thermal failure if allowed to operate at continuous high-power, embodiments of the present invention may be utilized along such hot spots to allow the system to maintain its design, while minimizing any risk of thermal failure.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention are further scalable to allow for additional clients and servers, as particular applications may require.

What is claimed is:

1. A high-power, heat dissipating optical fiber device comprising:
    a section of optical fiber configured to propagate light, the section of optical fiber including an uncoated fiber segment and a coated fiber segment;
    a cooling chamber, substantially encapsulating the section of optical fiber;
    a heat-dissipating fluid within the cooling chamber having a refractive index selected to control the interaction and propagation of the light in the fluid;
    a fluid ingress and a fluid egress extending from a surface of the cooling chamber; and
    a pump for allowing fluid to flow through the cooling chamber, the pump forcing fluid into the fluid ingress and exiting the cooling chamber via the fluid egress;
    wherein the high-power, heat dissipating optical fiber device yields an output greater than one kilowatt of pump laser power; and
    wherein the fluid comprises a heat transfer coefficient of at least 100 W/m$^2$/deg.

2. The device of claim 1, wherein the refractive index of the fluid is selected to strip the propagating light exceeding a predetermined numerical aperture.

3. The device of claim 2, wherein the predetermined numerical aperture is substantially similar to that supported by the coated fiber segment.

4. The device of claim 1, wherein the refractive index is substantially similar to or greater than a refractive index of an outer surface of the optical fiber.

5. The device of claim 1, wherein the refractive index is substantially similar to or less than a refractive index of an outer surface of an outer coating of the optical fiber that is in contact with the fluid.

6. The device of claim 1, wherein the optical fiber comprises a stripped section of a coated fiber, and wherein the refractive index of the fluid is less than that of the outer surface of the bare fiber.

7. The device of claim 1, wherein the cooling chamber comprises sealant on a first end and a second end thereof, the sealant comprising a refractive index substantially similar to a refractive index of the outer surface of the optical fiber that is in contact with the sealant.

8. The device of claim 1, wherein the fluid comprises a liquid.

9. The device of claim 8, wherein the liquid comprises at least one of water or an oil-based liquid.

10. The device of claim 1, wherein the fluid comprises a gas.

11. The device of claim 1, wherein the section of optical fiber experiences substantially no shear stress in operation.

12. The device of claim 1, wherein the fluid is substantially transparent to pump radiation.

13. A cooling system for an optical pump and signal combiner comprising:
   a pump and signal combiner capable of yielding an output greater than one kilowatt of pump laser power, comprising at least a section of optical fiber, the section of optical fiber including an uncoated fiber segment and a coated fiber segment;
   a cooling chamber, substantially encapsulating the pump and signal combiner;
   a liquid within the cooling chamber, wherein the liquid is substantially transparent to pump radiation and comprises a refractive index substantially similar to a refractive index of the bare fiber; and
   a pump for allowing fluid to continuously flow through the cooling chamber, the pump forcing fluid into the fluid ingress and exiting the cooling chamber via the fluid egress; and
   wherein the fluid comprises a heat transfer coefficient of at least 100 W/m$^2$/deg.

14. The system of claim 13, wherein the cooling chamber comprises sealant on a first end and a second end thereof, the sealant comprising a refractive index substantially similar to a refractive index of the bare fiber.

15. The system of claim 13, wherein the liquid comprises at least one of water, an oil-based liquid, or a refractive index-matching liquid.

16. The system of claim 13 further comprising:
   a fluid ingress and a fluid egress extending from a surface of the cooling chamber.

17. A method of cooling a pump and signal combiner comprising:
   providing a pump and signal combiner, the combiner comprising at least a section of optical fiber, the section of optical fiber including an uncoated fiber segment and a coated fiber segment;
   encapsulating the pump and signal combiner in a cooling chamber having a fluid therein, a fluid ingress and a fluid egress extending from a surface of the cooling chamber, wherein the fluid is substantially transparent to pump radiation and comprises a refractive index substantially similar to a refractive index of the bare fiber;
   introducing a measurable amount of pump light into the pump and signal combiner; and
   producing an output greater than one kilowatt of pump laser power from the
   pump and signal combiner; and
   utilizing a pump to allow fluid to continuously flow through the cooling chamber, the pump forcing fluid into the fluid ingress and exiting the cooling chamber via the fluid egress; and
   wherein the fluid comprises a heat transfer coefficient of at least 100 W/m$^2$/deg.

\* \* \* \* \*